(12) United States Patent
Lai

(10) Patent No.: US 7,098,283 B2
(45) Date of Patent: Aug. 29, 2006

(54) REACTIVE YELLOW DYES USEFUL FOR OCULAR DEVICES

(75) Inventor: Yu-Chin Lai, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 168 days.

(21) Appl. No.: 10/657,495

(22) Filed: Sep. 8, 2003

(65) Prior Publication Data

US 2005/0054797 A1    Mar. 10, 2005

(51) Int. Cl.
  *C08F 20/60*    (2006.01)
(52) U.S. Cl. .................. 526/305; 526/279; 526/307.6; 526/307.7; 526/310; 526/317.1; 526/318.1; 526/318.4; 526/319; 526/326; 526/328.5
(58) Field of Classification Search ............... 526/279, 526/305, 307.6, 307.7, 310, 317.1, 318.1, 526/318.4, 319, 326, 328.5; 525/479
See application file for complete search history.

(56) References Cited

U.S. PATENT DOCUMENTS

| | | | |
|---|---|---|---|
| 5,470,932 A | 11/1995 | Jinkerson | 526/312 |
| 5,528,322 A | 6/1996 | Jinkerson | 351/163 |
| 5,543,504 A | 8/1996 | Jinkerson | 534/856 |
| 5,662,707 A | 9/1997 | Jinkerson | 623/6 |
| 5,891,931 A | 4/1999 | Leboeuf et al. | 522/64 |
| 6,015,842 A | 1/2000 | LeBoeuf et al. | 522/64 |
| 6,353,069 B1 | 3/2002 | Freeman et al. | 526/319 |
| 6,878,792 B1 * | 4/2005 | Ichinohe | 528/28 |

FOREIGN PATENT DOCUMENTS

| | | |
|---|---|---|
| EP | 1293541 A2 | 3/2003 |
| JP | 2000-89171 | 3/2000 |

OTHER PUBLICATIONS

Stiller et al., Proceeding of SPIE (2003), 5122, 173-178.*
Sabi et al. Japanese Journal of Applied Physics, Part I: (2001), 40(3B), 1613-1618.*
Adameck et al. Applied Physics Letters (1998), 73(20), 2884-2886. □□.*
Hill et al. Journal of Applied Physics (1991), 70(8), 4649-51.*
Muller et al., "The use of a silicone-bonded azo dye as chemical proton detector," Chemical Abstracts, vol. 133 (No. 19), p. 659-662, (Nov. 6, 2000).
Kostyukov et al., "Synthesis of allyl derivatives of azo dyes and their capacity for copolymerization with vinyl monomers," Chemical Abstracts, vol. 83 (No. 8), p. 173, (Aug. 25, 1975).

* cited by examiner

*Primary Examiner*—Helen L. Pezzuto
(74) *Attorney, Agent, or Firm*—Toan P. Vo

(57) ABSTRACT

Novel azo-based reactive yellow dyes and a process for manufacturing and using ocular devices having blue light absorption properties. Intraocular lenses so produced block blue light from reaching the retina of an eye implanted with the IOL. By blocking blue light from reaching the retina, the IOL thereby prevents potential damage to the retina.

6 Claims, No Drawings

REACTIVE YELLOW DYES USEFUL FOR OCULAR DEVICES

FIELD OF THE INVENTION

The present invention relates to a process for making ocular devices with blue light absorption properties. More particularly, the present invention relates to novel yellow dyes having vinyl polymerizable groups capable of copolymerization with monomers and/or oligomers to produce copolymers useful in the manufacture of intraocular lenses or other optical devices capable of blocking blue light.

BACKGROUND OF THE INVENTION

Since the 1940's optical devices in the form of intraocular lens (IOL) implants have been utilized as replacements for diseased or damaged natural ocular lenses. In most cases, an intraocular lens is implanted within an eye at the time of surgically removing the diseased or damaged natural lens, such as for example, in the case of cataracts. For decades, the preferred material for fabricating such intraocular lens implants was poly(methyl methacrylate), which is a rigid, glassy polymer.

Softer, more flexible IOL implants have gained in popularity in more recent years due to their ability to be compressed, folded, rolled or otherwise deformed. Such softer IOL implants may be deformed prior to insertion thereof through an incision in the cornea of an eye. Following insertion of the IOL in an eye, the IOL returns to its original pre-deformed shape due to the memory characteristics of the soft material. Softer, more flexible IOL implants as just described may be implanted into an eye through an incision that is much smaller, i.e., less than 4.0 mm, than that necessary for more rigid IOLs, i.e., 5.5 to 7.0 mm. A larger incision is necessary for more rigid IOL implants because the lens must be inserted through an incision in the cornea slightly larger than the diameter of the inflexible IOL optic portion. Accordingly, more rigid IOL implants have become less popular in the market since larger incisions have been found to be associated with an increased incidence of postoperative complications, such as induced astigmatism.

With recent advances in small-incision cataract surgery, increased emphasis has been placed on developing soft, foldable materials suitable for use in artificial IOL implants. Mazzocco, U.S. Pat. No. 4,573,998, discloses a deformable intraocular lens that can be rolled, folded or stretched to fit through a relatively small incision. The deformable lens is inserted while it is held in its distorted configuration, then released inside the chamber of the eye, whereupon the elastic property of the lens causes it to resume its molded shape. As suitable materials for the deformable lens, Mazzocco discloses polyurethane elastomers, silicone elastomers, hydrogel polymer compounds, organic or synthetic gel compounds and combinations thereof.

In recent years, blue light (400–500 nm) has been recognized as being potentially hazardous to the retina. Accordingly, yellow dyes to block blue light have been used in foldable intraocular lenses, in conjunction with ultraviolet light absorbers, to avoid potential damaging effects. Freeman et al., U.S. Pat. No. 6,353,069, disclose high refractive index copolymers comprising two or more acrylate and/or methacrylate monomers with aromatic groups. Ophthalmic devices made of the copolymers may also include colored dyes, such as the yellow dyes disclosed in U.S. Pat. No. 5,470,932. Such materials exhibit sufficient strength to allow devices made of them, such as intraocular lenses, to be folded or manipulated without fracturing.

Because of the ophthalmic risks associated with blue light exposure, new materials and methods of manufacturing ophthalmic devices are needed to aid in minimizing or eliminating such risks.

SUMMARY OF THE INVENTION

Soft, foldable, high refractive index, ocular devices, such as for example intraocular lenses (IOLs), capable of absorbing blue light are prepared in accordance with the present invention through the use of one or more novel reactive yellow dyes having blue light absorbing properties. Blue light absorbing ocular devices, such as IOLs, are produced in accordance with the present invention through the copolymerization of one or more novel yellow dyes having vinyl polymerizable groups, with one or more acrylic-type monomers and/or one or more siloxane oligomers. Ocular devices so produced protect an eye's retina from potentially damaging blue light and thereby possibly provide protection from macular degeneration.

Blue light blocking ocular devices of the present invention are produced by copolymerizing one or more novel yellow dyes having vinyl polymerizable groups with one or more acrylic-type monomers and allowing the same to undergo free radical copolymerization. Alternatively, ocular devices of the present invention may be produced by copolymerizing one or more novel yellow dyes having vinyl polymerizable groups with one or more siloxane oligomers having hydrosilane groups through a hydrosilation reaction. Such production processes yield ocular devices with blue light absorbing properties. By absorbing blue light, the ocular devices serve to block blue light from reaching and potentially damaging the retina of an eye implanted with the device. Ocular devices, such as IOLs so produced are transparent, relatively high in elongation and relatively high in refractive index.

Accordingly, it is an object of the present invention to provide a process for the production of ocular devices capable of absorbing blue light.

Another object of the present invention is to provide a process for the production of ocular devices having relatively high refractive indices and good clarity.

Another object of the present invention is to provide a process for the production of ocular devices that are flexible.

Still another object of the present invention is to provide biocompatible ocular devices capable of absorbing blue light.

These and other objectives and advantages of the present invention, some of which are specifically described and others that are not, will become apparent from the detailed description and claims that follow.

DETAILED DESCRIPTION OF THE INVENTION

The present invention relates to a series of novel azo-based reactive yellow dyes useful in the production of high refractive index ocular devices such as for example but not limited to IOLs. Ocular devices produced using the azo-based reactive yellow dyes of the present invention have blue light absorption properties that reduce or prevent blue light from reaching the retina of an eye implanted with the ocular device. Azo-based reactive yellow dyes of the present invention have vinyl polymerizable groups such as for example but not limited to itaconic, fumatate, maleic, vinylacetyl, crotonic, or derivatives thereof, styrene, norbornenyl, vinyl, allyl, or like alkenyl groups. The azo-based reactive yellow dyes' vinyl polymerizable groups allow the same to copolymerize with acrylic-type monomers through free radical copolymerization, or with siloxane oligomers having hydrosilane groups through a hydrosilation reaction.

Azo-based yellow dyes of the present invention have the generalized structure illustrated in Formula 1 below.

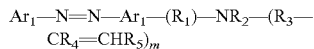    FORMULA 1

Here, the $Ar_1$ groups represent the same or different, substituted or unsubstituted $C_{6-36}$ aromatic groups such as for example but not limited to phenyl or naphthyl, which are responsible for providing blue light absorption properties to the yellow dye; $R_1$ is nothing or a straight or branched $C_{1-10}$ alkylene spacer consisting of one or more of the atoms C, H, N, O, S, P, Si, Cl or Br in any combination; $R_2$ is hydrogen or a $C_{1-10}$ alkyl such as for example but not limited to methyl, butyl or hexyl when m is 1, or is nothing when m is 2; $R_3$ is nothing, a straight or branched $C_{1-10}$ alkylene spacer consisting of one or more of the atoms C, H, N, O, S, P, Si, Cl or Br in any combination, or when $R_4$ is $CH_2COOR_2$ or $R_5$ is $COOR_2$, a carbonyl group; $R_4$ is hydrogen, a $C_{1-10}$ alkyl such as for example but not limited to ethyl, propyl or pentyl, or $CH_2COOR_2$; $R_5$ is hydrogen, a $C_{1-10}$ alkyl such as for example but not limited to methyl, propyl or butyl, or $COOR_2$; and m is 1 or 2.

Depending on the structure of the novel azo-based yellow dye to be synthesized, the yellow dye can be prepared by two different synthetic schemes. Both synthetic schemes involve diazotization of an aromatic amine, followed by coupling with different groups of interest depending on the desired structure of the yellow dye being synthesized. As for example, one synthetic scheme can be initiated by the reaction of N-phenyl diethanolamine with a diazonium salt of aniline, followed by a reaction with a vinyl-containing acid chloride or isocyanate to produce a reactive yellow dye. The same is further illustrated in Reaction Scheme 1 below.

REACTION SCHEME 1

$Ar_1$—$NH_2$ + $NaNO_2$ ——▶ $Ar_1N_2^+$
$Ar_1N_2^+$ + $Ar_1$—$N(CH_2CH_2OH)_2$ ——▶
$\qquad Ar_1$—$N$=$N$—$Ar_1$—$N(CH_2CH_2OH)_2$ Then, $Ar_1$—$N$=$N$—$Ar_1$—$N(CH_2CH_2OH)_2$ +
$R_5$—$COCl$  or  $R_5$—$O$—$CO$—$O$—$R_5$ ——▶
$\qquad Ar_1$—$N$=$N$—$Ar_1$—$N(CH_2CH_2OCO$—$R_5)_2$ or $Ar_1$—$N$=$N$—$Ar_1$—$N(CH_2CH_2OH)_2$ +
$R_5$—$NCO$ ——▶
$\qquad Ar_1$—$N$=$N$—$Ar_1$—$N(CH_2CH_2OCONH$—$R_5)_2$ $Ar_1$ = as defined above for Formula 1
$R_5$ = as defined above for Formula 1

Another reaction scheme involves reaction of an aromatic alkylamine with a vinyl-containing acid chloride, anhydride or isocyanate to give an ethylenically unsaturated polymerizable amide or carbamate. The same is then allowed to couple with the diazonium salt of an aromatic amine to produce a yellow dye as illustrated in Reaction Scheme 2 below.

REACTION SCHEME 2

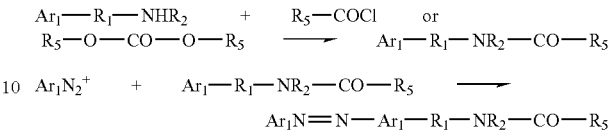

$Ar_1$ = as defined above for Formula 1
$R_1$ = as defined above for Formula 1
$R_2$ = as defined above for Formula 1
$R_5$ = as defined above for Formula 1

Preferred reactive yellow dyes of the present invention useful in the manufacture of ocular devices with blue light absorbing properties include for example but are not limited to N-2-[3'-(2''-methylphenylazo)-4'-hydroxyphenyl]ethyl vinylacetamide illustrated below in Formula 2, N-2-[3'-(2''-methylphenylazo)-4'-hydroxyphenyl]ethyl maleimide illustrated below in Formula 3, N,N-bis-(2-vinylacetoxyethyl)-(4'-phenylazo)aniline illustrated below in Formula 4 and N,N-bis-(2-allylcarbamatoethyl)-(4'-phenylazo)aniline illustrated below in Formula 5.

FORMULA 2

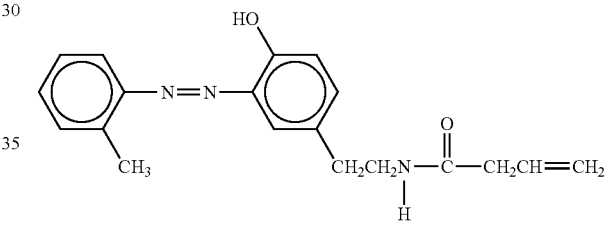

FORMULA 3

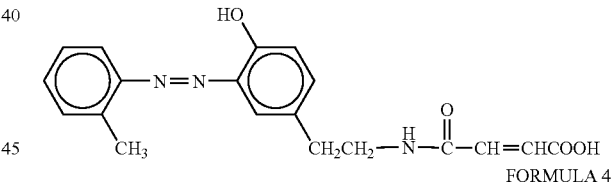

FORMULA 4

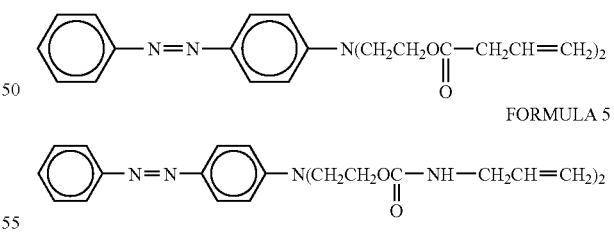

FORMULA 5

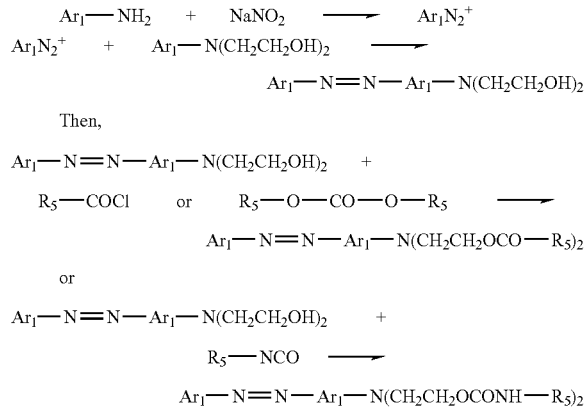

Reactive yellow dyes of the present invention synthesized as described above can be used in the manufacture of blue light blocking ocular devices by copolymerizing one or more of the subject reactive yellow dyes having polymerizable groups with one or more acrylic-type monomers and allowing the same to undergo free radical copolymerization. Alternatively, ocular devices of the present invention may be produced by copolymerizing one or more of the subject reactive yellow dyes having polymerizable groups with one or more siloxane oligomers having hydrosilane groups through a hydrosilation reaction using a platinum-silicone complex as a catalyst. Such production processes yield ocular devices with blue light absorbing properties. Reactive yellow dyes of the present invention may also be used to impart blue light absorption properties to a semi-fininshed silicone ocular device such as for example but not limited to an IOL. A "semi-finished" silicone IOL for purposes of the present invention, is a silicone IOL having free hydrosilyl groups.

Suitable acrylic-type monomers for copolymerization with one or more reactive yellow dyes of the present invention include for example but are not limited to 2-ethylphenoxy methacrylate, 2-ethylphenoxy acrylate, 2-ethylthiophenyl methacrylate, 2-ethylthiophenyl acrylate, 2-ethylaminophenyl methacrylate, 2-ethylaminophenyl acrylate, phenyl methacrylate, benzyl methacrylate, 2-phenylethyl methacrylate, 3-phenylpropyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl) ethyl methacrylate, 2-(4-chlorophenyl)ethyl methacrylate, 2-(4-bromophenyl)ethyl methacrylate, 2-(3-phenylphenyl) ethyl methacrylate, 2-(4-phenylphenyl)ethyl methacrylate, 2-(4-benzylphenyl)ethyl methacrylate, methacrylate, 4-methylphenyl methacrylate, 4-methylbenzyl methacrylate, 2,2-methylphenylethyl methacrylate, 2,3-methylphenylethyl methacrylate and methacrylate-capped prepolymers with multiple blocks of polydimethyl-co-diphenyl-co-methylphenyl siloxanes linked with urethane linkages.

Suitable siloxane oligomers for copolymerization with one or more reactive yellow dyes of the present invention include for example but are not limited to vinyl-capped prepolymers of high refractive index polysiloxanes such as α, ω-divinyl polydimethyl-co-diphenyl siloxane, silicone resin with multiple vinyl groups and trimethylsiloxy-terminated polydimethyl-co-methylhydrosiloxane.

The process of the present invention for preparing flexible, high refractive index ocular devices with blue light absorption properties is described in still greater detail in the Examples provided below.

EXAMPLE 1

Synthesis of N,N-bis-(2-hydroxyethyl)-(4-phenylazo) aniline (Solvent Yellow 58)

The synthesis of N, N-bis-(2-hydroxyethyl)-(4-phenylazo) aniline is accomplished by coupling the diazonium salt of aniline with N-phenyl diethanolamine. A detailed procedure is also described in D. L. Jinkerson, U.S. Pat. No. 5,470,932, incorporated herein in its entirety by reference.

EXAMPLE 2

Synthesis of N,N-bis-(2-allylcarbamatoethyl)-(4'-phenylazo)aniline

A 1000-mL 3-neck, round bottom flask connected with a reflux condenser and a drying tube, is charged with 250 mL of methylene chloride, 5.7 grams (0.02 mole) of N,N-bis-(2-hydroxyethyl)-(4-phenylazo)aniline, 3.28 g of allyl isocyanate (0.04 mole) (Aldrich Chemical, Inc., Milwaukee, Wis.) and 0.014 g of dibutyltin dilaurate (Aldrich Chemical). The mixture is heated and refluxed overnight under vigorous stirring. The mixture is then checked with infrared spectroscopy and no residual isocyanate peak is found indicating the reaction is complete. The mixture is concentrated using a rotavapor. High performance liquid chromatography (HPLC) analysis indicates only one major product. The product is then passed through silica gel chromatography to give final purified product with a yield of at least 80 percent. The product is identified by nuclear magnetic resonance (NMR) and Mass Spectroscopy.

EXAMPLE 3

Synthesis of N,N-bis-(2-vinylacetoxyethyl)-(4'-phenylazo)aniline

A 1000-mL 3-neck, round bottom flask connected with a reflux condenser and a drying tube, is charged with 250 mL of methylene chloride, 5.7 grams (0.02 mole) of N, N-bis-(2-hydroxyethyl)-(4-phenylazo)aniline aniline and 4.04 grams of triethylamine (0.04 mole). The contents are chilled with an ice bath. Through a dropping funnel, 4.18 g (0.04 mole) of vinylacetyl chloride is added into the flask over a period of 30 minutes. The ice bath is then removed and the contents are continuously stirred overnight. The mixture is then filtered and then condensed using a rotavapor. HPLC analysis indicates only one major product. The product is then passed through silica gel chromatography to give a final purified product with a yield of at least 80 percent. The product is identified by NMR and Mass Spectroscopy.

EXAMPLE 4

Synthesis of N-2-[3'-(2"-methylphenylazo)-4'-hydroxyphenyl]ethyl vinylacetamide

N-2-[3'-(2"-methylphenylazo)-4'-hydroxyphenyl]ethyl vinylacetamide can be made in two steps. The first step is the formation of 4-vinylacetamidoethyl phenol. The second step is the coupling of azonium salt of toluidine with the phenol to give the product.

Step 1. Synthesis of 4-vinylacetamidoethyl phenol.

A 1000 mL 3-neck, round bottom flask connected with a reflux condenser and a drying tube, is charged with 250 mL of methylene chloride, 5.48 grams (0.04 mole) 4-aminoethylphenol and 4.04 grams (0.04 mole) triethylamine. The contents are chilled with an ice bath. Through a dropping funnel, 4.18 grams (0.04 mole) of vinylacetyl chloride is added into the flask over a period of 30 minutes. The ice bath is then removed and the contents are continuously stirred overnight. The mixture is then filtered and then condensed using a rotavapor. HPLC analysis indicates only one major product. The product is then passed through silica gel chromatography to give a final purified product with a yield of at least 80 percent. The product is identified by NMR and Mass Spectroscopy.

Step 2. Coupling of product from Step 1 with toluidine diazonium salt.

The procedure is the same as that described in U.S. Pat. No. 5,470,932, Example 1, second half except the acrylamidoethyl phenol is replaced with 4-vinylacetamidoethyl phenol. The product is identified by NMR and Mass Spectroscopy.

EXAMPLE 5

Preparation of Yellow Dye Solution for Coating of an IOL

Solutions containing 1, 2, 5 and 10 weight percent of the yellow dye of Example 4 in methylene chloride is prepared. To these solutions, platinum-cyclovinylmethylsiloxne complex (Gelest, Inc., Tullytown, Pa.) at 1% of the weight of the yellow dye is also added.

EXAMPLE 6

Coating of Silicone Intraocular Lenses

Ten (10) freshly thermally cured SoFlex™ Model LI61U (Bausch & Lomb, Incorporated, Rochester, N.Y.) lenses are submerged into each coating solution as described in Example 3 for 30, 60 and 120 minutes. Takes out lenses and air dry them. Then place these lenses in an oven at 80 to 90° C. for an hour. These lenses are then subjected to standard processing to get the final finished product.

Model LI61 U lenses are silicone IOLs derived from components consisting of a vinyl terminated polydimethyl-co-diphenyl siloxane, silicon-based reinforcing resins with vinyl groups, and an oligomer with multi hydrosilane units. Model LI61 U silicone lenses have excess free hydrosilane groups after curing

EXAMPLE 7

Selection of Yellow Dye Concentration and Coating Conditions

Run ultraviolet (UV) and visible absorption spectroscopy of coated lenses before and after processing. Select the yellow dye concentration and residence time of lens in dye solution based on the visible light absorption of the process lenses between 400–500 nm. Conditions, which give less than 50% transmittance and maintenance of lens power/cosmetics are chosen for further coating studies, followed by optimization of conditions.

Soft, foldable relatively high refractive index of approximately 1.42 or greater, relatively high elongation of approximately 100 percent or greater, IOLs with blue light absorption properties are synthesized through the process of the present invention. Suitable catalysts for use in the process of the present invention, for a hydrosilation reaction, include but are not limited to platinum (3–3.5%)-divinyltetramethyldisiloxane complex and platinum (3–3.5%)-cyclovinylmethylsiloxane complex.

The IOLs produced as described herein have the flexibility required to allow the same to be folded or deformed for insertion into an eye through the smallest possible surgical incision, i.e., 3.5 mm or smaller. It is unexpected that the subject IOLs described herein could possess the ideal physical properties disclosed herein. The ideal physical properties of the subject IOLs are unexpected because changes in mechanical properties such as modulus, percent elongation and tear strength can occur upon addition of the reactive dye functional groups.

IOLs manufactured in accordance with the present invention can be of any design capable of being rolled or folded for implantation through a relatively small surgical incision, i.e., 3.5 mm or less. Such IOLs may be manufactured to have an optic portion and haptic portions made of the same or differing materials. Once the material(s) are selected, the same may be cast in molds of the desired shape, cured and removed from the molds. After such molding, the IOLs are treated in accordance with the process of the present invention and then cleaned, polished, packaged and sterilized by customary methods known to those skilled in the art.

In addition to IOLs, the process of the present invention is also suitable for use in the production of other medical or ophthalmic devices such as contact lenses, keratoprostheses, capsular bag extension rings, corneal inlays, corneal rings and like devices.

IOLs manufactured in accordance with the present invention are used as customary in the field of ophthalmology. For example, in a surgical cataract procedure, an incision is placed in the cornea of an eye. Through the corneal incision the cataractous natural lens of the eye is removed (aphakic application) and an IOL is inserted into the anterior chamber, posterior chamber or lens capsule of the eye prior to closing the incision. However, the subject ophthalmic devices may likewise be used in accordance with other surgical procedures known to those skilled in the field of ophthalmology.

While there is shown and described herein a process for producing ocular devices with blue light absorption properties, it will be manifest to those skilled in the art that various modifications may be made without departing from the spirit and scope of the underlying inventive concept and that the same is not limited to particular processes and structures herein shown and described except insofar as indicated by the scope of the appended claims.

I claim:

1. Polymeric compositions comprising:
    at least one material comprising a compound having a formula selected from the group consisting of

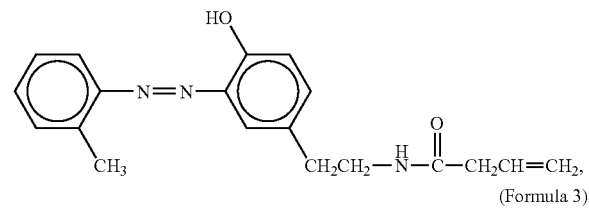

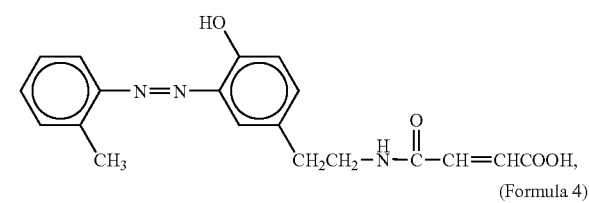

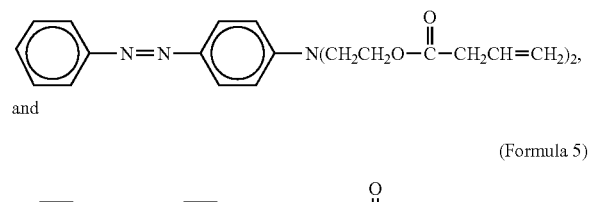

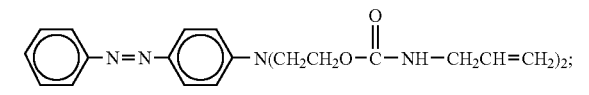

said at least one material being copolymerized with one or more acrylic-type monomers.

2. A method of making polymeric compositions comprising:
    copolymerizing at least one material with one or more acrylic-type monomers, wherein said at least one material comprising a compound having a formula selected from the group consisting of

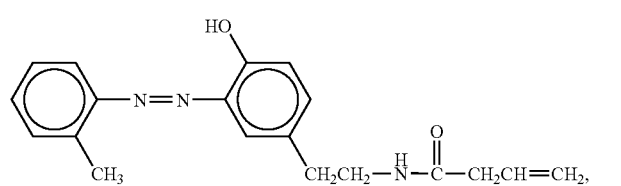
(Formula 2)

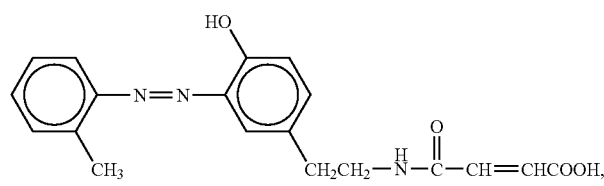
(Formula 3)

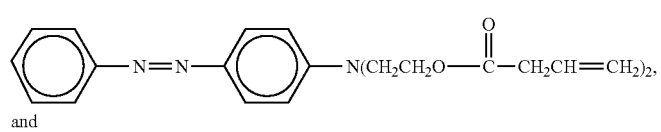
(Formula 4)

and

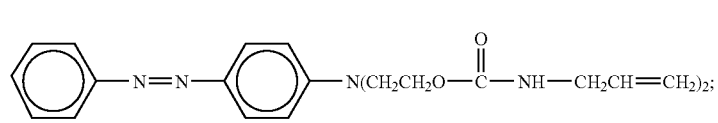
(Formula 5)

3. The method of claim 2 wherein said polymeric compositions are produced through free radical copolymerization.

4. Polymeric compositions comprising:
  at least one material comprising a compound having a formula selected from the group consisting of (Formula 2)

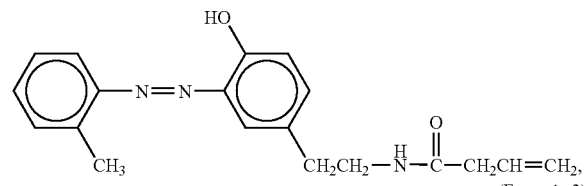

(Formula 3)

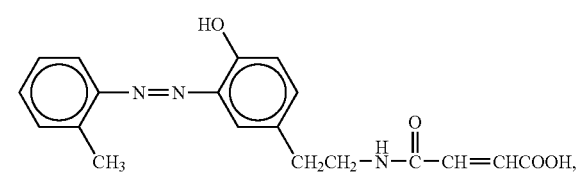

-continued (Formula 4)

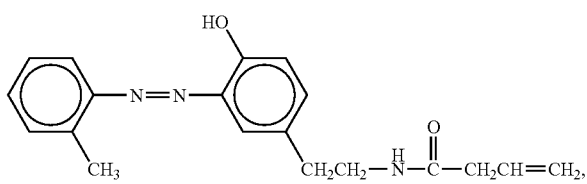

and (Formula 5)

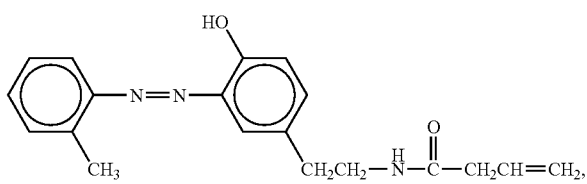

said at least one material being copolymerized with one or more siloxane oligomers.

5. A method of making polymeric compositions comprising:
  copolymerizing at least one material with one or more siloxane oligomers, wherein said at least one material comprising a compound having a formula selected from the group consisting of (Formula 2)

-continued
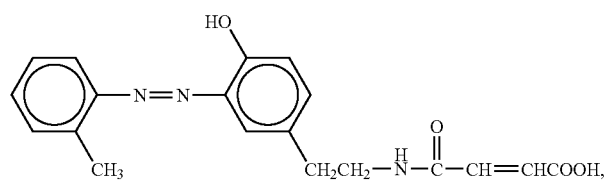
(Formula 3)
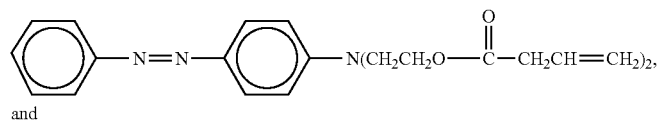
and
(Formula 4)
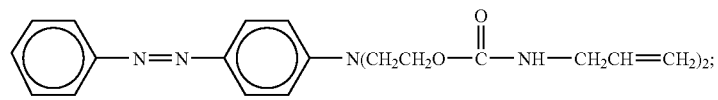
(Formula 5)
6. The method of claim 5 wherein said polymeric compositions are produced through a hydrosilylation reaction.
* * * * *